United States Patent [19]
Fuji et al.

[11] Patent Number: 6,129,777
[45] Date of Patent: Oct. 10, 2000

[54] METHOD OF PRODUCING REDUCED IRON AGGLOMERATES

[75] Inventors: Kojiro Fuji; Hidetoshi Tanaka; Takao Harada, all of Kakogawa; Takeshi Sugiyama, Osaka; Yoshimichi Takenaka, Kakogawa; Kazuya Miyagawa, Kakogawa; Shoji Shirouchi, Kakogawa; Haruhisa Iwakiri, Kakogawa; Makoto Nishimura, Kobe; Takao Umeki, Kakogawa; Sumito Hashimoto, Kakogawa; Teruhisa Uehara, Kakogawa, all of Japan

[73] Assignee: Kabushiki Kaisha Kobe Seiko Sho, Kobe, Japan

[21] Appl. No.: 09/275,017

[22] Filed: Mar. 24, 1999

[51] Int. Cl.$^7$ ...................................................... C21B 11/00
[52] U.S. Cl. ............................................... 75/484; 75/503
[58] Field of Search ....................................... 75/503, 484

[56] References Cited

U.S. PATENT DOCUMENTS

| | | |
|---|---|---|
| 3,443,931 | 5/1969 | Beggs et al. . |
| 4,597,564 | 7/1986 | Hanewald et al. . |
| 4,622,905 | 11/1986 | MacDougall et al. . |
| 4,676,741 | 6/1987 | Pargeter . |
| 4,701,214 | 10/1987 | Kaneko et al. . |
| 5,186,741 | 2/1993 | Kotraba et al. . |
| 5,601,631 | 2/1997 | Rinker et al. . |
| 5,730,775 | 3/1998 | Meissner et al. . |
| 5,782,957 | 7/1998 | Rinker et al. . |

OTHER PUBLICATIONS

F.N. Griscom, et al., Steel Times, vol. 222, No. 12, pp. 491–493, "The Fastmet Process Coal Based Direct Reduction for the EAF", Dec., 1994.

R.H. Hanewald et al., Iron and Steel Engineer, vol. 62, No. 3, pp. 62–67, "Recovery of Metals from Steel Wastes and Production of DRI by the INMETCO Process", Mar., 1985.

*Primary Examiner*—George Wyszomierski
*Assistant Examiner*—Janelle Combs Morillo
*Attorney, Agent, or Firm*—Oblon, Spivak, McClelland, Maier & Neustadt, P.C

[57] ABSTRACT

Iron oxide agglomerates incorporated with the carbonaceous material having a particle size within a range of about 10 to 30 nm are prepared upon production of reduced iron agglomerates. Then, the iron oxides agglomerates incorporated with the carbonaceous material were laid thinly at a laying density of less than 1.4 kg/m$^2$/mm or lower on a hearth of a moving hearth furnace. Subsequently, the iron oxide agglomerates are heated rapidly such that the surface temperature of the iron oxide agglomerates reaches 1200° C. or higher within one-third of the retention period of time of the iron oxide agglomerates in the moving hearth furnace. Then, the iron oxide agglomerates are reduced till the metallization ratio thereof reaches 85% or higher to form reduced iron agglomerates and then the reduced iron agglomerates are discharged out of the moving hearth furnace. With the procedures, reduced iron agglomerates of a high average quality can be obtained at a high productivity.

6 Claims, 10 Drawing Sheets

METHOD OF PRODUCING REDUCED IRON AGGLOMERATES

BACKGROUND OF THE INVENTION

1. Field of the Invention

The present invention concerns a method of producing reduced iron agglomerates by reducing iron oxide agglomerates incorporated with a carbonaceous material.

2. Description of the Related Art

The MIDREX method is well-known as a method of producing reduced iron. In the MIDREX method, a reducing gas produced from natural gas is fed through a tuyere into a shaft furnace and allowed to rise therein for reduction of iron ores or iron oxide pellets charged therein, to thereby produce reduced iron. However, since the method required a supply, as a fuel, of a large amount of high-cost natural gas, the location of a plant utilizing the MIDREX method is limited to a region producing natural gas.

In view of the above, a certain type of method for producing reduced iron has become of interest, in which relatively inexpensive coal can be used instead of natural gas as a reducing agent. A method of producing reduced iron is disclosed, for example, in U.S. Pat. Nos. 3,443,931 and 5,601,631 being hereby fully incorporated by reference, in which powdery ores and carbonaceous materials are mixed and pelletized and then reduced by heating in a high-temperature atmosphere to thereby produce reduced iron. This method has advantages in that coal can be used as a reducing agent, as well as powder of ores can be used directly, reduction can be performed at a high rate and the carbon content of products can be regulated.

In the method described in the U.S. patent applications, dried iron oxide agglomerates are charged in a traveling hearth heating furnace such as a rotary hearth furnace, heated while moving in the furnace and the iron oxide agglomerates are reduced by a carbonaceous material.

Reduction of the iron oxide agglomerates by the carbonaceous material proceeds from the surface of the agglomerates in view of the heat transfer. Accordingly, in the latter half of the reduction process, while metallic iron is deposited on the upper surface layer of the agglomerates, the reducing reaction has not yet proceeded sufficiently in the central portion or the lower surface where the temperature is low, and the quality of the reduced iron is not satisfactory. In addition, while the temperature for the rotary hearth furnace is controlled by a combustion burner or secondary combustion of a combustible gas released from the agglomerates, it is necessary to burn the combustible gas released from the fuel and the agglomerates substantially completely at the exit of the furnace in order to decrease the fuel unit. However, unless an appropriate reducing atmosphere is maintained, the agglomerates are exposed to an oxidizing gas, particularly, in the latter half of the reducing zone and the metallic iron at the surface layer of the agglomerates is reoxidized to deteriorate the quality of products.

Further, the iron oxide agglomerates should be of a size suitable to operation conditions. Those of a size suitable to the operation conditions attain a high quality after reduction, whereas those of a size smaller than the appropriate size are reoxidized due to excess heating, while those of a size greater than the appropriate size are reduced only insufficiently due to insufficient heating. In addition, if the particle size of the agglomerates is scattered, both of the reduction ratio and the strength are deteriorated as a whole product.

SUMMARY OF THE INVENTION

An object of the present invention is to provide a method of producing reduced iron capable of obtaining reduced iron agglomerates having high average quality at a high productivity.

In the method of producing the iron oxide agglomerates according to the present invention, iron oxide agglomerates incorporated with a carbonaceous material having a particle size ranging about from 10 to 30 mm are produced at first. Then, the iron oxide agglomerates incorporated with the carbonaceous material are laid thinly at a laying density of 1.4 $kg/m^2/mm$ or less on a hearth of a moving hearth furnace. Subsequently, the iron oxide agglomerates are heated rapidly such that the surface temperature of the iron oxide agglomerates is raised to 1200° C. or higher within one-third of a retention time of the iron oxide agglomerates in the moving hearth furnace. Then, after reducing the iron oxide agglomerates to a metallization ratio of 85% or higher to form reduced iron agglomerates and then, the reduced iron agglomerates are discharged out of the moving hearth furnace.

In the step of producing the iron oxide agglomerates incorporated with the carbonaceous material, it is desirable to arrange such that more than 80% of the iron oxide agglomerates are within a range for ±2 mm of the aimed particle size. It is also desirable that the maximum flowability of the carbonaceous material used is 0.8 or more upon softening and melting.

It is desirable that the apparent density of the iron oxide agglomerates produced in the step of producing the iron oxide agglomerates incorporated with the carbonaceous material is 2.3 $g/cm^3$ or more.

Further, in the step of reducing the iron oxide agglomerates incorporated with the carbonaceous material, it is desirable to control the reduction ratio of a waste gas from a burner for heating the iron oxide agglomerates for Fe or FeO equilibrium before the amount of CO gas released from the iron oxide agglomerates during reduction is reduced to less than one-fourth of that at peak of generation. Further, it is desirable that the apparent density of the iron oxide agglomerates after reduction is 2 $g/cm^3$ or higher.

DESCRIPTION OF THE PREFERRED EMBODIMENTS

Heat is transmitted predominantly by radiation of heat in a furnace. Therefore, it is important to lay the iron oxide agglomerates incorporated with the carbonaceous material with no overlapping, in view of uniform heating, improvement of the productivity and improvement of the quality. For this purpose, it is desirable to make the laying density on the hearth to 1.4 kg/m²/mm or lower. In this text, "kg/m²" in the unit for the laying density means mass of the iron oxide agglomerates per unit area of the hearth, and "mm" in the unit for the laying density means the average particle size of the iron oxide agglomerates.

Figure 5:
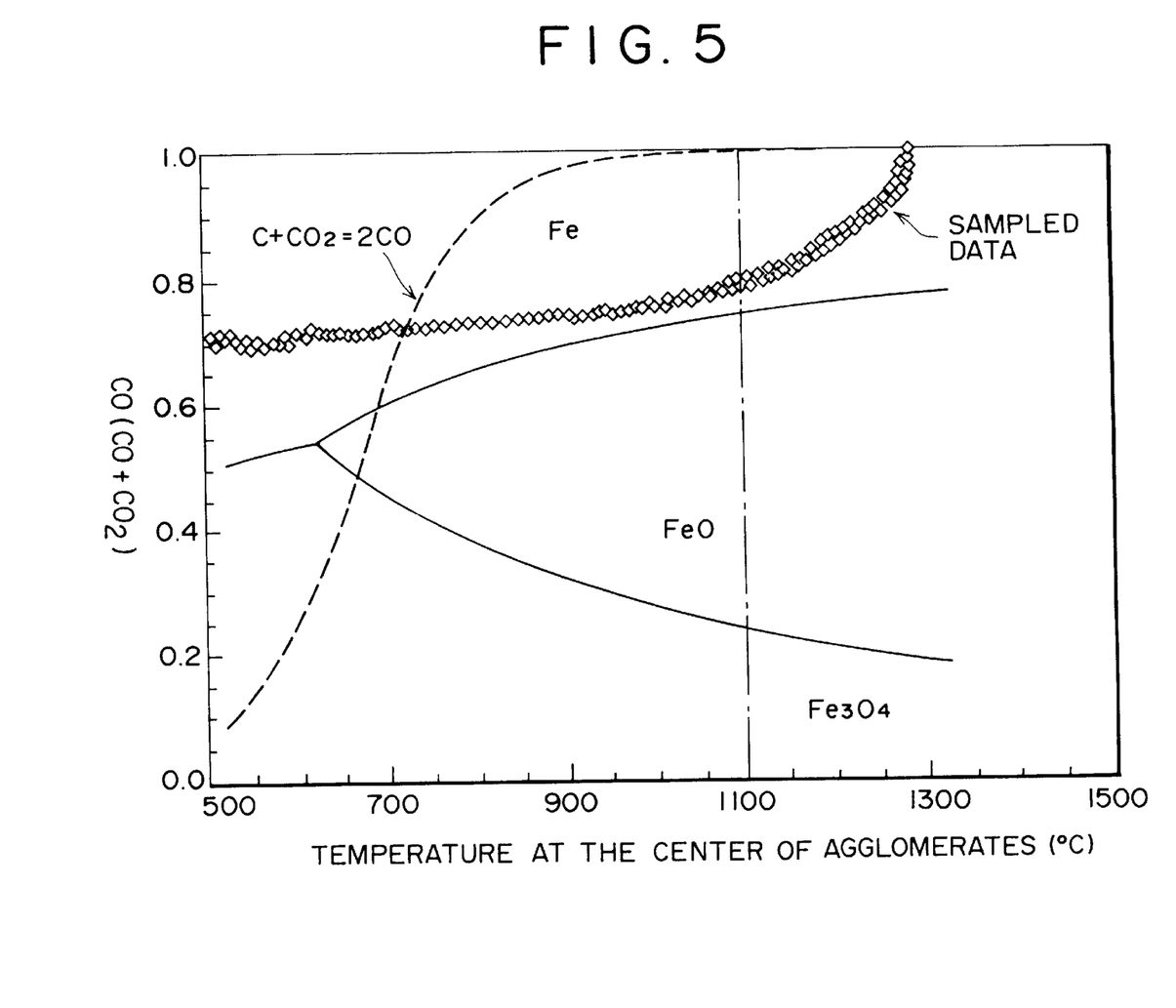
FIG. 5 is a view showing a relation between the temperature at the center of the agglomerates and the gas reduction ratio [$CO/(CO+CO_2)$] in Example 4.

Further, as shown in FIG. 5, since the reduction ratio $[CO/(CO+CO_2)]$ (shown by sampled data) rises abruptly if the temperature exceeds 1200° C., it is important to rapidly heat the iron oxide agglomerates charged in the furnace to 1200° C. thereby promoting the reduction of the agglomerates. For this purpose, a heating time up to 1200° C. is desirably as short as possible. However, considering restriction in the actual operation, the surface temperature of the agglomerates may be raised to 1200° C. within one-third period of the retention time in the furnace after charging.

At the instant the amount of CO gas released from the iron oxide agglomerates is lowered to ¼ compared with that at the peak of CO gas generation during reduction, the central portion of the oxide agglomerates is reduced, while metallic iron is deposited on the surface layer. Accordingly, reoxidation of the metallic iron at the surface layer can be prevented and the reduction at the surface layer can be promoted by controlling the reduction ratio of the waste gas from the burner for Fe or FeO equilibrium.

By conducting molding upon softening and melting thereby filling the carbonaceous material in a space between each of iron oxide in the agglomerates, the heat conductivity in the agglomerates can be improved. It is desirable to use a carbonaceous material having a maximum flowability upon softening and melting of 0.8 or greater. In this case, the surface of the agglomerates is not melted in the furnace even when the gas temperature in the furnace is raised in order to enhance the productivity. Further, since the iron oxide agglomerates incorporated with the carbonaceous material is put to pressure molding, the gap at the inside is decreased also by this process, to improve the heat conductivity. The reducing reaction is promoted by the improvement of the heat conductivity of the iron oxide agglomerates and, as a result, the productivity in the reduced iron production can be improved.

Further, when the apparent density of the iron oxide agglomerates incorporated with the carbonaceous material is increased, mass of the iron oxide agglomerates per unit area of the hearth is increased to improve the productivity. Accordingly, it is desirable that the apparent density of the iron oxide agglomerates is 2.3 g/cm² or more.

Upon melting the reduced iron agglomerates, if the apparent density of the iron oxide agglomerates is higher than that of slags in the melting furnace, since the reduced iron agglomerates do not float on the slags, the dissolution rate of the reduced iron agglomerates is increased. Accordingly, it is desirable that the apparent density of the reduced iron agglomerates after the reduction is 2 g/cm³ or more which is greater than the usual apparent density of the slags.

Further, as the particle size of the reduced iron oxide agglomerates incorporated with the carbonaceous material is made more uniform, the agglomerates can be laid with no overlapping on the hearth. Further, deterioration of the quality due to excess heating or insufficient heating can be avoided to obtain products of uniform quality. Accordingly, it is desirable to control the particle size such that more than 80% of the iron oxide agglomerates incorporated with the carbonaceous material is within a range ±2 mm of the aimed particle size.

In the pelletization of the iron oxide agglomerates incorporated with the carbonaceous material, a fuel unit can be decreased by recovering gases released in the heat-mixing step, pressure molding step and degasing step of the raw material and utilizing the recovered gas as a fuel for a reducing burner. Further, reoxidation of the reduced iron agglomerates can be prevented by blowing the recovered gas at the final stage of reduction in the reducing furnace.

Further, a fuel supplied to the moving hearth heating furnace can be decreased by efficiently burning a combustible gas such as CO and $H_2$ released from the iron oxide agglomerates incorporated with the carbonaceous material in the vicinity of the iron oxide agglomerates as a matter to be heated in the reducing, thereby using the same as a heat source to be supplied to the matter to be heated. For this purpose, it is preferred to supply a secondary combustion air to burn the burnable gas.

EXAMPLE 1

Figure 1:
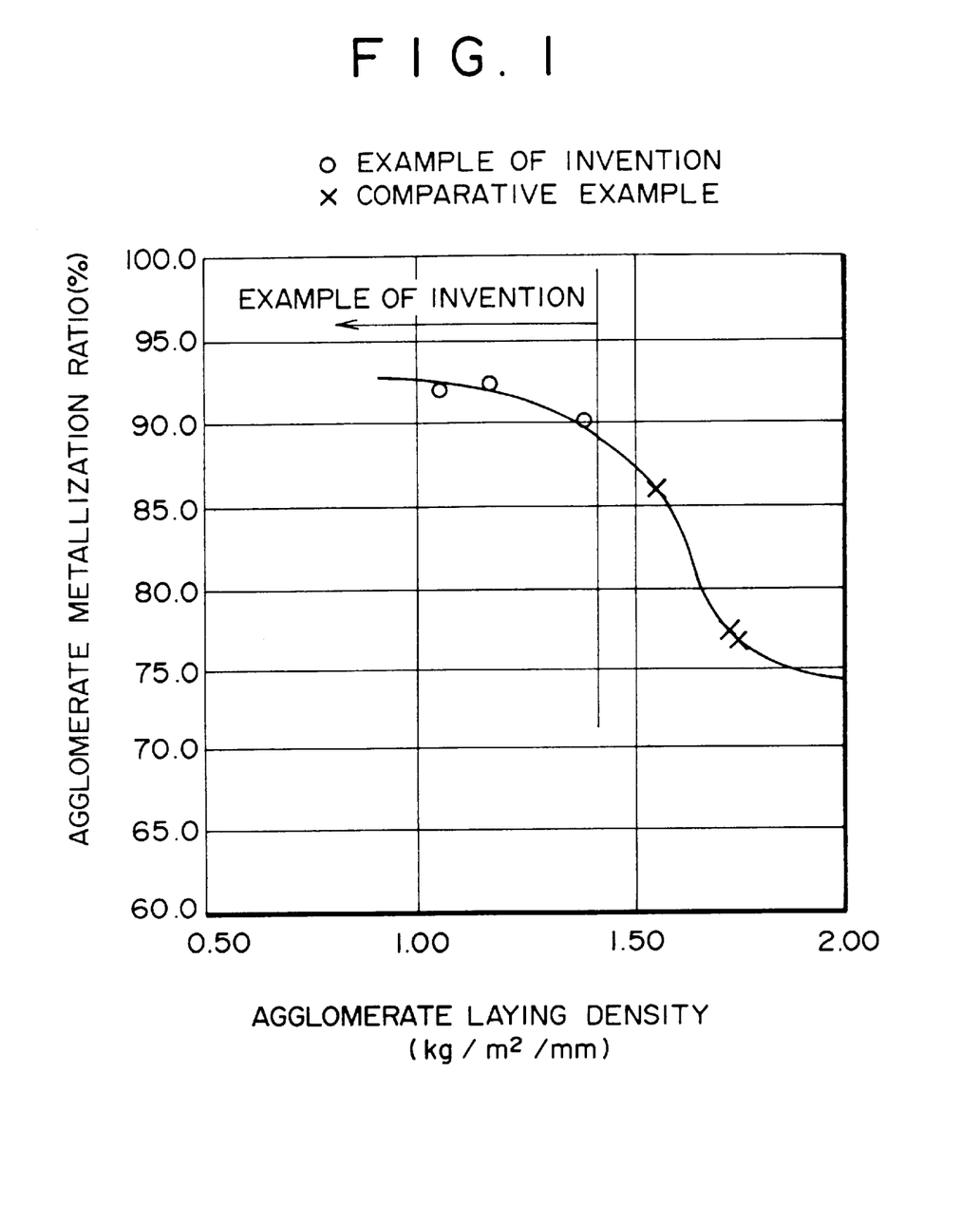
FIG. 1 is a view showing a relation between the laying density of agglomerates and a metallization ratio.

Iron oxide agglomerates comprising iron ore (78.3%) and coal (20.0%) of the ingredients shown in Table 1 in admixture with 1.7% of a binder were laid on a hearth at a laying density of 1.0 kg/m²/mm, and reduced by using a rotary hearth furnace at a productivity of 100 kg/m²/hr. The results are shown in FIG. 1. In a comparative example shown in the figure, the laying density was changed to 1.5 kg/m²/mm. As apparent from FIG. 1, if the laying density of the agglomerates exceeds 1.4 kg/m²/mm, lowering of the metallization ratio is observed. In order to improve the quality of the reduced iron agglomerates, it is preferred to make the layer thickness to less than 1, specifically, to make the laying density to less than 1.4 kg/m²/mm.

TABLE 1

|  |  |  |  | Dry mass % |
| --- | --- | --- | --- | --- |
| Iron ore | T.Fe | $SiO_2$ | $Al_2O_3$ | Particle size(−75 μm) |
|  | 67.9 | 1.0 | 0.5 | 71 |
| Coal | Fixed carbon | Volatile matter | Ash | Particle size(−75 μm) |
|  | 72.6 | 18.8 | 8.6 | 50–70 |

EXAMPLE 2

Figure 2:
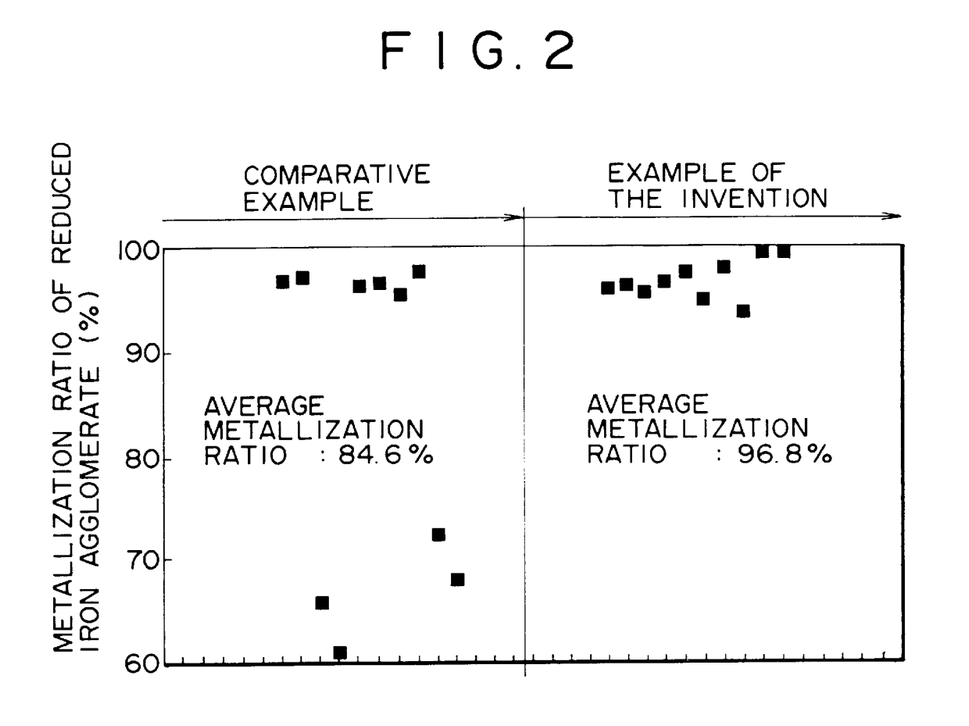
FIG. 2 is a view illustrating a difference between the metallization ratio of the reduced iron agglomerates in Example 2 and a comparative example.

The same iron oxide agglomerates incorporated with the carbonaceous material as those in Example 1 were laid at a laying density of 1.1 kg/m²/mm on the hearth so as not to overlap and reduced by using a rotary hearth furnace at a productivity of 80 kg/m²/hr. The size of the agglomerates was controlled such that 80% of them had a size within a range of ±2 mm of the aimed particle size. As a result, reduced iron agglomerates of the quality shown in FIG. 2 were obtained. The laying density of the comparative example was 1.5 to 1.75 kg/m²/mm. As apparent from FIG. 2, since the laying density is high in the comparative example, the metallization ratio of the reduced iron agglomerates at a portion in which the agglomerates are overlapped is reduced by about 30% compared with the example of the present invention. On the other hand, in the example of the present invention, reduced iron agglomerates of stable quality at the metallization ratio of 96% are obtained.

Figure 3:
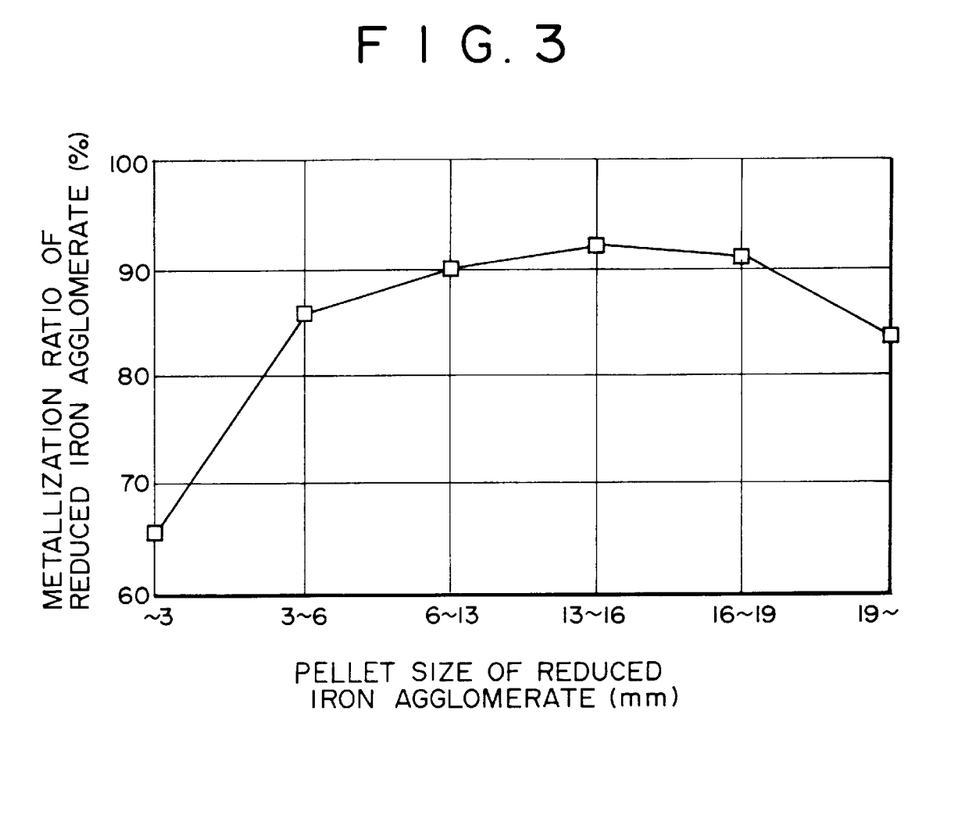
FIG. 3 is a view showing a relation between the particle size and the metallization ratio of the reduced iron agglomerates.

Further, FIG. 3 shows a relation between the particle size and the metallization degree of the reduced iron agglomerates. As shown in FIG. 3, peak of the metallization ratio is present at 13–16 mm of the particle size of the reduced iron agglomerates, and the metallization ratio is lowered as the particle size is out of the above-mentioned range. From the result, it is optimum that all of the agglomerates are within a range of ±1.5 mm of the aimed particle size, but it is not easy to attain the range of ±1.5 mm of the aimed particle size if the agglomerates are pelletized by a pan pelletizer and sieved by a roller screen. Then, 80% of the agglomerates can be put into the range of ±2 mm of the aimed particle size by applying press molding to the iron oxide agglomerates. The particle size of the agglomerates is usually from 10 to 30 mm although different depending on the operation conditions.

EXAMPLE 3

Figure 4:
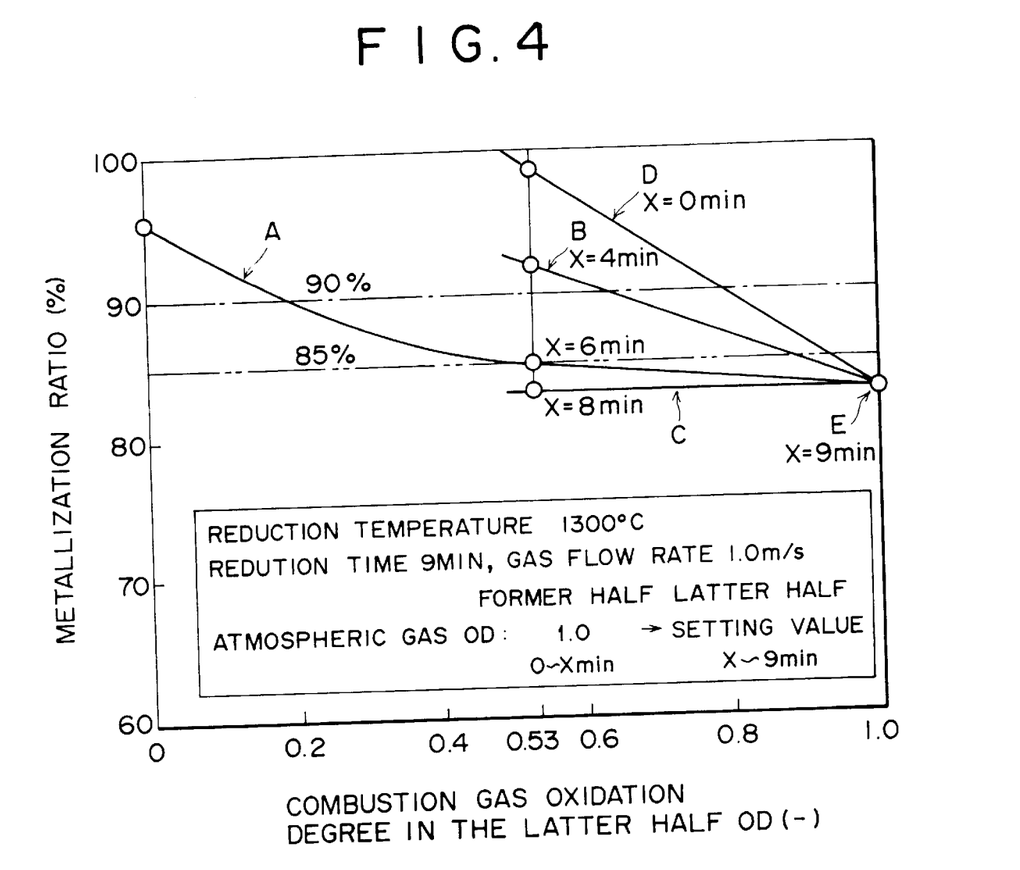
FIG. 4 is a view showing a relation between the reduction ratio of a combustion gas and the metallization ratio in the latter half of reduction in Example 3.

The same iron oxide agglomerates incorporated with the carbonaceous material as those in Example 1 were charged into a rotary hearth furnace and reduced at an atmospheric temperature of 1300° C. for 9 min. The laying density was 1.15 kg/m²/mm. The oxidation ratio of the combustion gas $[(CO_2+H_2O)/(CO+H_2+CO_2+H_2O)]$ was changed within a range from 1.0 in the former half and to 0–1.0 in the latter half. Further, the switching time between the former half and the latter half was also changed within a range from 0 to 8 min. FIG. 4 shows a relation between the oxidation ratio of the combustion gas and the metallization ratio in the latter half.

As shown in FIG. 4, the metallization ratio increases along with decrease of the oxidation ratio of the combustion gas and by switching to low oxidation ratio more early. Metallization ratio of 85% or higher is obtained if the oxidation ratio of the combustion gas in the latter half is switched to 0.53 within 6 min, and the metallization ratio of 90% or higher can be obtained by switching the oxidation ratio within 4 min, but if the switching time is late as 8 min, the metallization ratio is 85% or lower. Further, If the oxidation ratio of the combustion gas after switching is 0, the metallization ratio of 90% or higher can be ensured even if the switching time is late as 6 min. By the way, the amount of CO generated from the agglomerates is 80% of the peak generation at 4 min of the switching time, 47% of the peak generation at 6 min, and 13% of the peak generation at 8 min. Accordingly, improvement of the metallization ratio can not be expected even if the oxidation ratio of the combustion gas is switched to a low reduction ratio after the amount of CO generated from the agglomerates has been lowered to less than ¼ for the peak generation.

EXAMPLE 4

The same iron oxide agglomerates incorporated with the carbonaceous material as in Example 1 were charged so as not to be overlapped at a laying density of 1.04 kg/m²/mm into a rotary hearth furnace and reduced. Table 2 shows a portion of reducing conditions and the quality of the reduced iron agglomerates. The reduction ratio of the waste gas from the burner shown in the table is for $Fe_2O_3$ equilibrium. This reduction shows the presence of operation conditions capable of attaining a high metallization ratio even if the reduction ratio of the waste gas from the burner is not controlled for Fe or FeO equilibrium. This is considered as below. That is, as shown in FIG. 5, the temperature of the agglomerates is raised along with increase of the temperature in the furnace, in which the solution loss reaction is activated and the $CO/(CO+CO_2)$ value is increased. $CO/(CO+CO_2)$ value shows the reduction ratio of the burner waste gas and as the value is away from the boundary between Fe and FeO, the reducing potential is improved. Therefore, an extremely high reducing atmosphere is formed at the periphery of the agglomerates by the high temperature operation, and it is assumed that the effect by the reduction ratio of the burner waste gas is lowered.

TABLE 2

| Example | Metallization ratio (%) | Productivity (kg/m²/mm) | Gas Temperature near agglomerates (° C.) | Air/fuel ratio in the later half of reducing step | Gas atmosphere equilibrium metal |
|---|---|---|---|---|---|
| | 90–94 | 80 | 1300–1360 | 10.2 | $Fe_2O_3$ |

EXAMPLE 5

Figure 6:
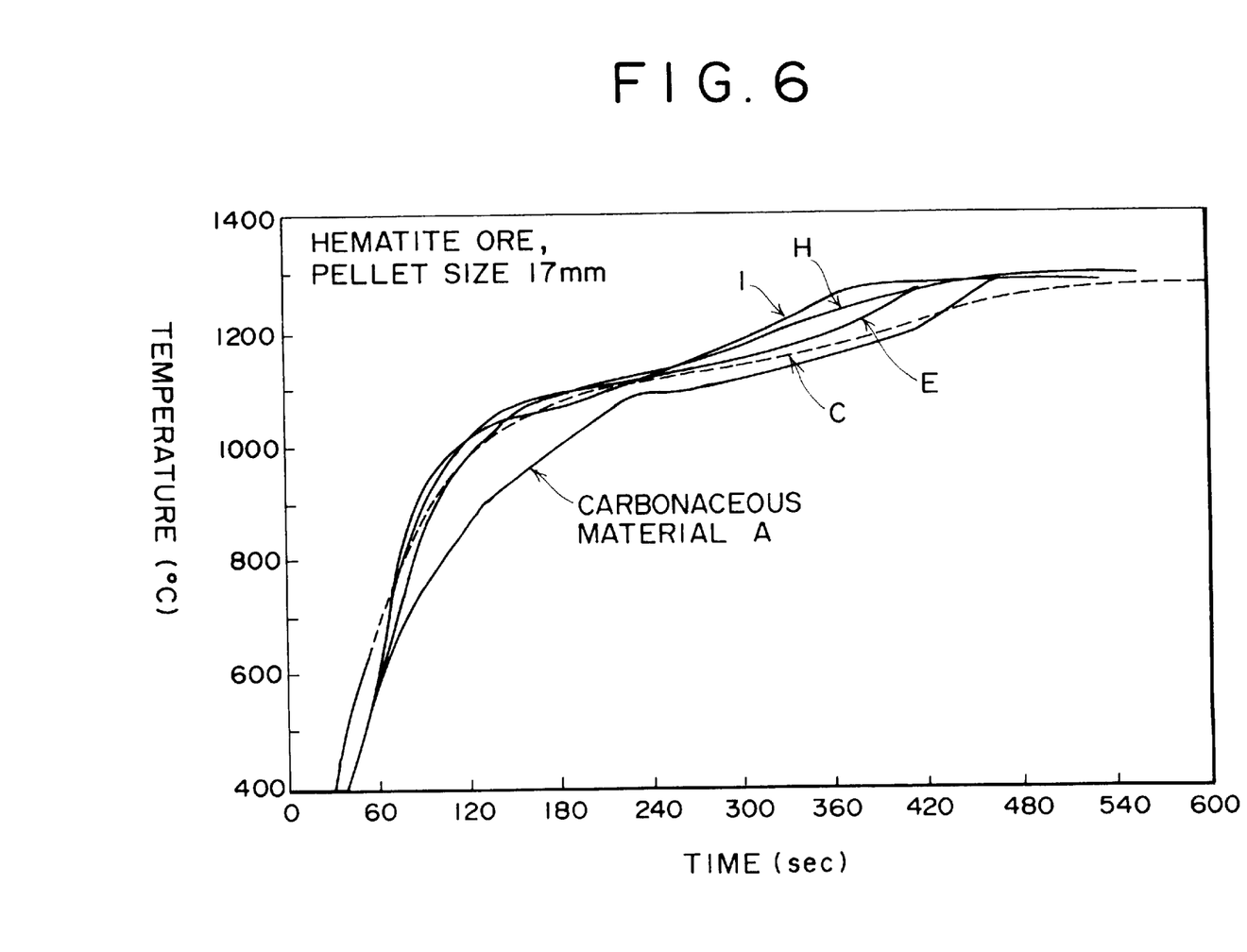
FIG. 6 is a view showing a relation between the heating time and the temperature at the center of the agglomerates when agglomerates using five kinds of carbonaceous materials of different flowability are heated in an atmospheric temperature at 1300° C.

FIG. 6 shows a relation between the heating time and the temperature at the center of agglomerates when agglomerates using five kinds of carbonaceous materials A, C, E, H and I of different fluidity were heated at an atmospheric temperature of 1300° C. As shown in FIG. 6, the time that the carbonaceous materials of high fluidity (carbonaceous materials H, I) reach 1300° C. is shorter compared with that of the carbonaceous materials of low fluidity (carbonaceous materials A, C). Further, since the reducing reaction starts at about 800° C., the temperature hysteresis in the course of the temperature elevation is also important, in which the temperature elevation rate at the inside of the agglomerates is high in a case of using carbonaceous materials of high fluidity. Based on the observation for the cross sectional tissue of the agglomerates in the reducing process, it was confirmed that connected structure of the iron oxide particles with a solid carbonaceous material was formed. In view of the above, it is preferred to use a carbonaceous material having a highest fluidity upon softening and melting of 0.8 or higher.

EXAMPLE 6

Figure 7:
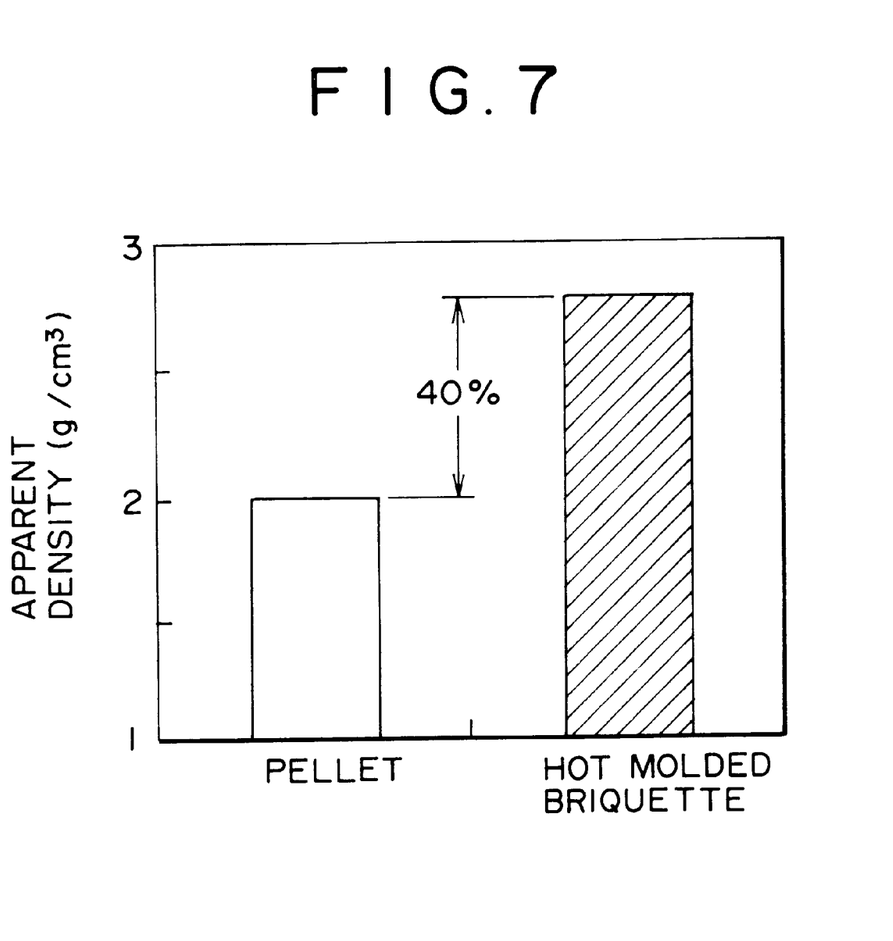
FIG. 7 is a view illustrating comparison the apparent density between hot-molded agglomerates (hot-pressed briquettes) of the present invention and green agglomerates after drying (pellets) of comparative examples.

After mixing the iron ore and pulverized coal shown in Table 1 at a ratio of 78% iron ore and 22% of coal, they were heated to 450° C. and agglomerates of 2 to 5 cm³ were hot molded at a pressure of 39 MPa (hot molded briquettes). As a comparative example, iron ore and pulverized coal were mixed at an identical mixing ratio to which bentonite was added by about 1% as a binder and molded into agglomerates of 2 cm³ volume (pellets) by a pelletizer. FIG. 7 shows an apparent density for each of them. As shown in FIG. 7, the hot molded agglomerates have an apparent density higher by 40%.

Figure 8:
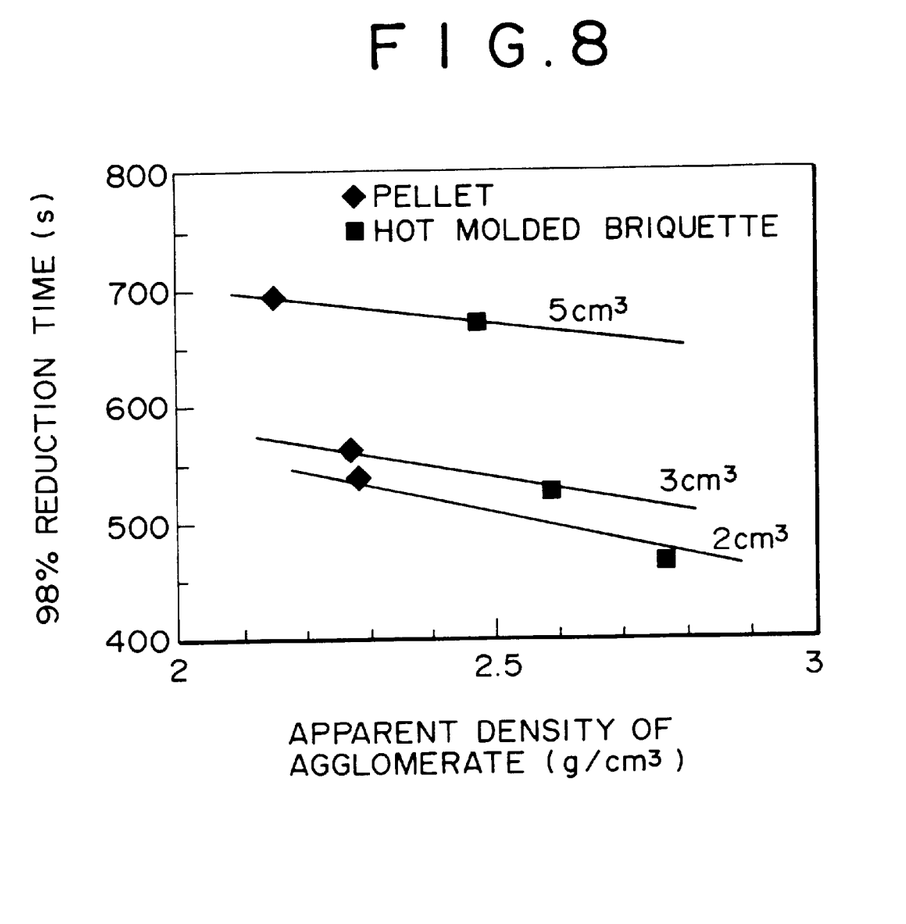
FIG. 8 is a view showing results of a reducing test conducted to a reducing furnace maintained at 1300° C. for hot pressed agglomerates and pelleted agglomerates with the apparent density being varied.
Figure 9:
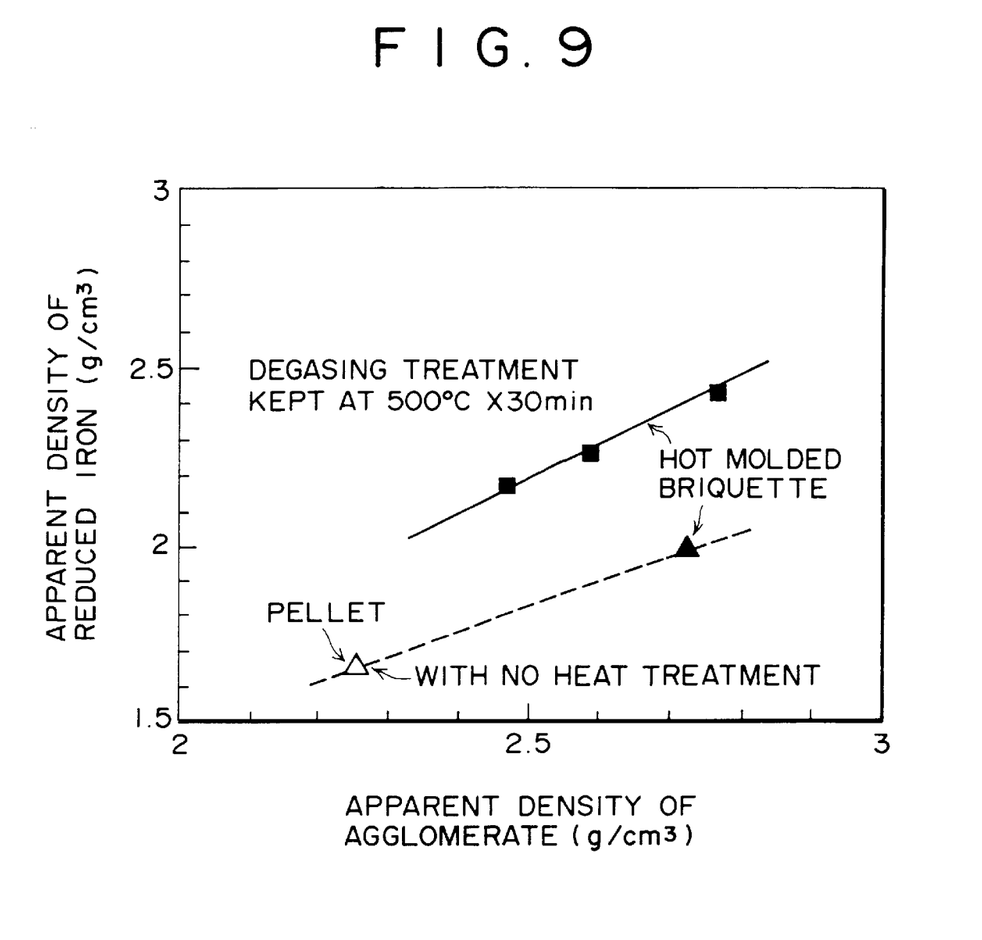
FIG. 9 is a view illustrating a relationship between the apparent density of agglomerates before reduction and the apparent density of reduced iron agglomerates.

Then, a reducing test was conducted in a reducing furnace in which hot molded agglomerates and pellet agglomerates were kept at 1300° C. The results are shown in FIG. 8. As apparent from the figure, the reduction time is shortened as the apparent density of the agglomerates is increased at an identical volume. Accordingly, the productivity is also improved by the increase in the apparent density of the agglomerates. FIG. 9 shows an apparent density of the agglomerates after reducing the hot molded agglomerates. As shown in the figure, as the apparent density of the agglomerates before reduction increases, the apparent density of the agglomerates after reduction also increases in proportion therewith. Further FIG. 9 shows that when the hot molded agglomerates are applied with a degasing treatment at 500° C. for 30 min, swelling of the agglomerates is decreased in the reducing step, and the apparent density of the reduced iron reaches 2 g/cm$^3$ or greater.

Figure 10:
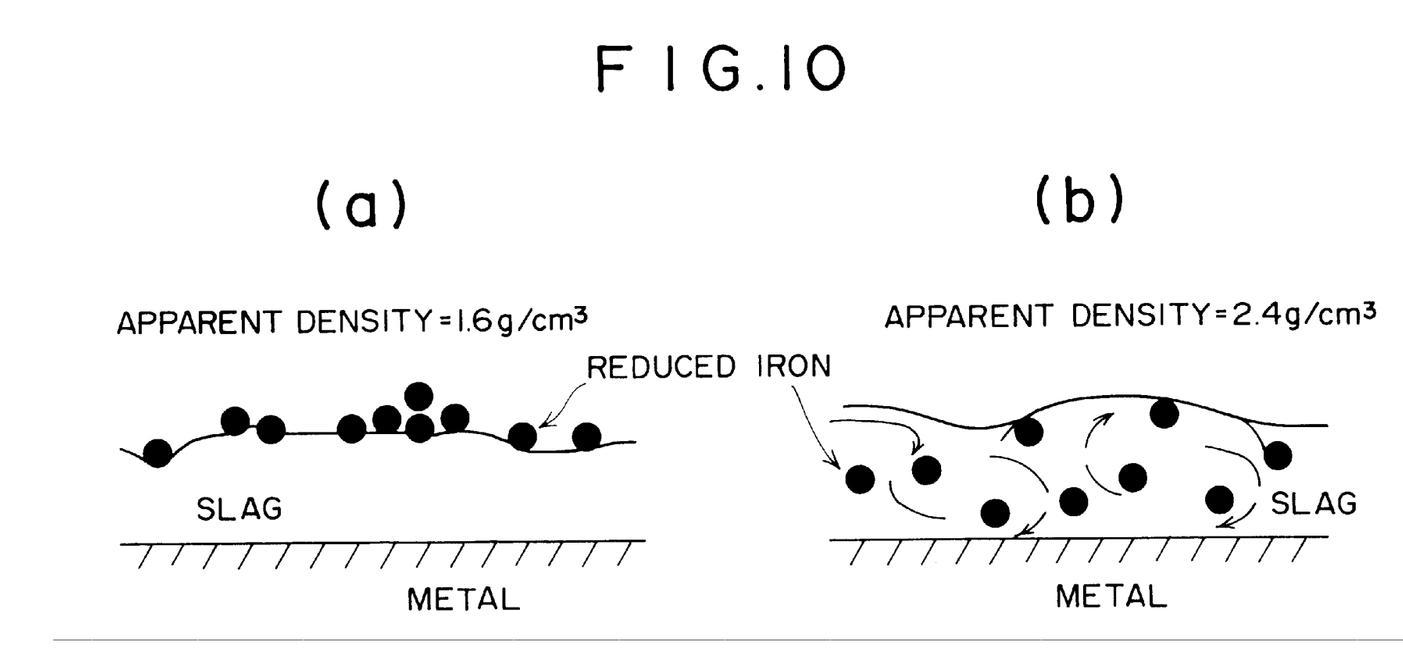
FIG. 10 is a view showing a result of an experiment in which reduced iron agglomerates having apparent density of 1.6 g/cm² and 2.4 g/cm² are melted in a crucible.

FIG. 10 shows the results of an experiment in which reduced iron agglomerates having an apparent density of 1.6 g/cm$^3$ and 2.4 g/cm$^3$ were melted in a crucible. The density of the molten slag is usually about 2 g/cm$^3$ and, if the apparent density of the reduced iron agglomerates is lower than that, the agglomerates float on the slag surface as shown in the figure and melting is retarded. On the other hand, if the apparent density of the reduced iron agglomerates is high, the agglomerates sink into the slags to promote melting. As a result of the test, if the apparent density of the agglomerates is 1.6 g/cm$^3$, the melting rate is 0.5 kg/min, while if the apparent density is 2.4 g/cm$^3$, the melting rate is 2 kg/min. As described above, the melting rate is improved to four times by increasing the apparent density of the reduced iron agglomerates to greater than the apparent density of the slags in the melting furnace.

While the invention has been described in detail and with reference to specific embodiments thereof, it will be apparent to one skilled in the art that various changes and modifications can be made therein without departing from the spirit and scope thereof.

The entire disclosure of the Japanese Patent Application No. 10-76032 filed on Mar. 24, 1998 including specification, claim drawings and summary are incorporated herein by reference in its entirety.

What is claimed is:

1. A method of producing reduced iron agglomerates comprising preparing iron oxide agglomerates each including a carbonaceous material and having a particle size within a range from about 10 to 30 mm;

laying the iron oxide agglomerates at a laying density of 1.4 kg/m$^2$/mm or lower on a hearth of a moving hearth furnace;

heating the iron oxide agglomerates such that a surface temperature of the iron oxide agglomerates reaches 1200° C. or higher within one-third of a retention period of time of the iron oxide agglomerates in the moving hearth furnace;

reducing the iron oxide agglomerates to a metallization ratio of 85% or higher to prepare reduced iron agglomerates; and then discharging the reduced iron agglomerates out of the moving hearth furnace, wherein the preparing iron oxide agglomerates comprises
selecting an aimed particle size; and
arranging so that more than 80% of the iron oxide agglomerates have a particle size within a range of ±2 mm of the aimed particle size.

2. The method as defined in claim 1, wherein a highest fluidity of the carbonaceous material upon softening and melting is 0.8 or higher.

3. The method as defined in claim 1, wherein the preparing iron oxide agglomerates prepares iron oxide agglomerates having an apparent density of 2.3 g/cm$^3$ or more.

4. The method as defined in claim 1, wherein the reducing the iron oxide agglomerates prepares reduced iron agglomerates having an apparent density of 2 g/cm$^3$ or higher.

5. The method as defined in claim 1, wherein said reducing the iron oxide agglomerates comprises, after a CO generation rate from the iron oxide agglomerates has reached a peak CO generation rate and before the CO generation rate then decreases to less than one-fourth of the peak CO generation rate, controlling a reduction ratio (CO/(CO+CO$_2$)) of a waste gas from a burner of an iron oxide agglomerate heater to be in equilibrium with Fe or FeO.

6. The method as defined in claim 1, wherein the iron oxide agglomerates are reduced to a metallization ratio of 90–94%.

* * * * *

UNITED STATES PATENT AND TRADEMARK OFFICE
CERTIFICATE OF CORRECTION

PATENT NO. : 6,129,777

DATED : October 10, 2000

INVENTOR(S): Kojiro FUJI, et al.

It is certified that an error appears in the above-identified patent and that said Letters Patent is hereby corrected as shown below:

On the Title Page, Item [30], the Foreign Application Priority Data has been omitted. Item [30] should read as follows:

--[30]  Foreign Application Priority Data

Mar. 24, 1998   [JP]   Japan...............................10-076032    --

Signed and Sealed this

Eighth Day of May, 2001

Attest:

NICHOLAS P. GODICI

Attesting Officer

Acting Director of the United States Patent and Trademark Office